US009731989B2

United States Patent
Polizzotti et al.

(10) Patent No.: US 9,731,989 B2
(45) Date of Patent: Aug. 15, 2017

(54) CHEMICAL OXIDATION OR ELECTROMAGNETIC TREATMENT IN SAGD OPERATIONS

(75) Inventors: David M. Polizzotti, Yardley, PA (US); Brian Christopher Moore, Mechanicville, NY (US); Vasile Bogdan Neculaes, Niskayuna, NY (US); Abdul Rafi Khwaja, Upper Gwynedd Township, PA (US); Matthew Alan Petersen, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 1554 days.

(21) Appl. No.: 12/971,556

(22) Filed: Dec. 17, 2010

(65) Prior Publication Data

US 2012/0152546 A1   Jun. 21, 2012

(51) Int. Cl.
C02F 9/00 (2006.01)
E21B 43/40 (2006.01)
(Continued)

(52) U.S. Cl.
CPC ............ C02F 9/00 (2013.01); E21B 43/2406 (2013.01); E21B 43/40 (2013.01); C02F 1/28 (2013.01); C02F 1/302 (2013.01); C02F 1/42 (2013.01); C02F 1/441 (2013.01); C02F 1/442 (2013.01); C02F 1/46 (2013.01); C02F 1/52 (2013.01); C02F 1/72 (2013.01); C02F 3/00 (2013.01);
(Continued)

(58) Field of Classification Search
None
See application file for complete search history.

(56) References Cited

U.S. PATENT DOCUMENTS 4,395,337 A * 7/1983 Ciepiela .................. 210/703
4,482,459 A * 11/1984 Shiver .................... 210/639
(Continued)

FOREIGN PATENT DOCUMENTS

WO   2009002295 A1   12/2008
WO   2009071981 A2   6/2009
(Continued)

OTHER PUBLICATIONS

Search Report and Written Opinion from corresponding PCT Application No. PCT/US2011/059680 dated Feb. 2, 2012.

*Primary Examiner* — Anuradha Ahuja

(57) ABSTRACT

A system for treating produced water, for example from a SAGD bitumen production operation, has a treatment unit using chemical oxidation (CO) or electromagnetic treatment (ET) to destroy or degrade organics in the produced water. The treatment module may use CO or ET in combination with biological treatment or sorption processes or both. When the treatment module is used upstream of a steam generator, it reduces fouling in the steam generator and in any blowdown water treatment device. A brine concentrator or a crystallizer may be used to treat the blowdown water. The treatment module may be used in combination with a nanofiltration (NF) or reverse osmosis (RO) membrane filter. Optionally, the produced water may be treated with an ET process such as microwaves directly upstream of a steam generator or upstream of a concentrator or crystallizer in a blowdown water stream.

13 Claims, 3 Drawing Sheets

(51) Int. Cl.

| | | |
|---|---|---|
| *C02F 1/28* | (2006.01) | |
| *C02F 1/42* | (2006.01) | |
| *C02F 1/44* | (2006.01) | |
| *C02F 1/72* | (2006.01) | |
| *C02F 5/02* | (2006.01) | |
| *E21B 43/24* | (2006.01) | |
| *C02F 1/30* | (2006.01) | |
| *C02F 1/46* | (2006.01) | |
| *C02F 1/52* | (2006.01) | |
| *C02F 3/00* | (2006.01) | |
| *C02F 103/36* | (2006.01) | |

(52) U.S. Cl.
 CPC ........ *C02F 5/025* (2013.01); *C02F 2103/365* (2013.01)

(56) References Cited

U.S. PATENT DOCUMENTS

| | | | |
|---|---|---|---|
| 4,676,908 A * | 6/1987 | Ciepiela et al. | 210/638 |
| 4,795,568 A * | 1/1989 | Chen | B01D 3/009 210/180 |
| 6,960,301 B2 * | 11/2005 | Bradley | 210/663 |
| 7,428,926 B2 * | 9/2008 | Heins | 166/266 |
| 7,591,309 B2 * | 9/2009 | Minnich et al. | 166/266 |
| 7,638,057 B2 * | 12/2009 | Zubot et al. | 210/631 |
| 7,722,773 B2 * | 5/2010 | Honji et al. | 210/673 |
| 2003/0127226 A1 * | 7/2003 | Heins | 166/303 |
| 2003/0127400 A1 * | 7/2003 | Kresnyak et al. | 210/767 |
| 2003/0173300 A1 * | 9/2003 | Bradley | 210/665 |
| 2005/0022989 A1 | 2/2005 | Heins | |
| 2006/0032630 A1 * | 2/2006 | Heins | 166/266 |
| 2007/0102359 A1 * | 5/2007 | Lombardi et al. | 210/639 |
| 2007/0125719 A1 * | 6/2007 | Yarbrough | C02F 9/00 210/748.15 |
| 2008/0245739 A1 * | 10/2008 | Honji et al. | 210/670 |
| 2009/0056945 A1 * | 3/2009 | Minnich et al. | 166/272.3 |
| 2011/0278222 A1 | 11/2011 | Ikuno | |

FOREIGN PATENT DOCUMENTS

| | | |
|---|---|---|
| WO | 2010060016 A1 | 5/2010 |
| WO | 2010079684 A1 | 7/2010 |

* cited by examiner

CHEMICAL OXIDATION OR ELECTROMAGNETIC TREATMENT IN SAGD OPERATIONS

FIELD

This specification relates to the treatment of produced water or wastewater from oil or gas production and to a steam assisted gravity drainage (SAGD) process.

BACKGROUND

The following discussion is not an admission that anything discussed below is citable as prior art or common general knowledge.

In various forms of oil and gas production, produced or other water streams are created that must be treated for disposal or re-use. For example, in a bitumen mining process known as Steam Assisted Gravity Drainage (SAGD), steam is produced in a boiler or generator and injected into bitumen bearing soil. The steam reduces the viscosity of the bitumen allowing a mixture of water and bitumen to flow to a production well. After this mixture is extracted, most of the oil is removed in an initial primary oil-water separation step.

The remaining water, called produced water, is treated through various unit operations to make it suitable for re-use in generating steam. The produced water contains, for example, residual oil, suspended and dissolved solids (organic and inorganic), and silica at near the limit of solubility. Oil may be removed from the produced water by a second oil-water separation step such as gas flotation or a walnut shell filter. Hot or warm lime softening may be used to remove silica and hardness. Particle filtration, for example through an anthracite bed, may be used to reduce total suspended solids. Strong or weak acid cation exchange softeners may be used to further reduce hardness. Each of these processes produces a waste stream that is treated further for one or more of disposal, further water recovery and further oil recovery.

After treatment, the produced water can be re-used to generate steam. The steam generators used in SAGD operations commonly include a Once Through Steam Generator that produces about 80% steam (vapour) and about 20% liquid droplets. The liquid fraction is removed from the steam in a blowdown stream before the steam is injected into the bitumen deposit. The OTSG blowdown water is further processed or, where permitted, disposed for example in a tailings pond or by deep well injection.

INTRODUCTION

The following introduction is intended to introduce the reader to the detailed description to follow and not to limit or define any claimed invention.

A primary purpose of the produced water treatment steps described above is to provide water of suitable quality to the steam generator. Silica and hardness in the raw produced water in particular would rapidly destroy a steam generator. Accordingly, the treatment steps are focused to a large extent on controlling hardness and silica. However, even after a two-stage process of lime softening followed by cation exchange softening, the water reaching an OTSG in an existing SAGD operation may still have near 1 mg/L of hardness.

Other contaminants are controlled to a lesser extent. For example, treated produced water in an existing SAGD operation may still contain 100 to 2,000 mg/L of dissolved organics when it reaches the OTSG. These organics can be aromatic or aliphatic, but with a higher tendency to being aromatic in structure. In addition to the dissolved organics, the produced water entering the OTSG also still contains low concentrations of emulsified oils, with a possibility of higher concentrations at times when the treatment processes are upset. These organics or oils, or both, contribute to the fouling of OTSG.

As a result of the remaining contaminants in re-used produced water, a foulant layer builds up on OTSG walls. The foulant layer reduces the heat transfer efficiency from the fire side of the OTSG to the water side of the OTSG, impeding steam production. To maintain steam production rates, more energy is required to overcome the insulating effect of the foulant layer to create a constant amount of steam. The OTSG must be periodically cleaned to remove the build-up. If the OTSG is not cleaned often enough, the OTSG may overheat and fail. Heat exchangers are similarly subject to fouling and must be cleaned periodically.

Besides contributing to steam generator fouling, the organics and oils in produced water also interfere with other parts of the produced water treatment process. For example, because most contaminants remain in the liquid fraction after the produced water passes through an OTSG, the contaminants are concentrated in the blowdown water. At an OTSG blowdown ratio of 20%, the blowdown water may contain roughly 500 to 5,000 mg/L of dissolved organics. Disposal options for the blowdown water, such as deep-well injection or disposal into tailings ponds, are becoming less viable and available in oil production areas, including the oil sands area or Canada. This increases the desire to treat the blowdown water, potentially to a near or zero liquid discharge standard. Thermal evaporation or concentration and crystallization could be useful options but a high organic concentration in the blowdown water impedes the crystallization process and may prevent complete drying of the waste solids.

Further, the organics and oils interfere with the use of alternative technologies for removing one or more of hardness, suspended solids and silica. For example, nanofiltration (NF) or reverse osmosis (RO), alone or in combination with each other or electrocoagulation (EC), would in theory work very well for removing hardness, and any suspended solids or silica remaining after upstream treatment steps. However, the organic molecules pose a fouling risk to the NF or RO membranes and interfere with achieving the full potential of NF or RO membranes in a SAGD operation.

Various processes are described herein in which a treatment unit uses chemical oxidation (CO) or electromagnetic treatment (ET) to destroy organic contaminants such as emulsified oil and dissolved organics. These are integrated into a SAGD produced water re-use and treatment system. Optionally, the treatment module may use CO or ET in combination with other technologies such as biological treatment or a sorption process or both. When CO or ET is used in combination with other technologies, the CO or ET partly degrades the organics and the subsequent process further degrades, or reduces the concentration of, the degraded organics. Optionally, an ET process may comprise treating the water with microwaves. In addition to degrading organics, the microwaves heat the water, which assists in generating steam for injection from the process water or in drying blowdown water.

Organics that are degraded by the CO or ET process tend to be characterized by a more negative charge and reduced aromatic and double bond content. The degraded organics have a reduced tendency to foul many surfaces. A further treatment step, if any, further reduces the fouling tendencies of the water. Components that are prone to fouling, such as an OTSG, heat exchangers and resin based ion exchange softeners, operate more efficiently in the treated produced water. Further, fouling critical devices, such as membrane filters and crystallizers, may be used even with raw produced water having initially high concentrations of organic foulants.

In a plant described herein, a CO or ET treatment module is used to treat produced water upstream of a steam generator. In this location, the treatment module reduces fouling in the steam generator and in any blowdown treatment device. In another plant described herein, the treatment module is used in combination with a nanofiltration (NF) or reverse osmosis (RO) membrane filter which is also located upstream of a steam generator. In this location, the treatment module reduces fouling in the steam generator directly and by providing water suitable for treatment in the membrane filter, which further softens the water. In another plant described herein, an ET module using microwaves is located directly upstream of an OTSG, or upstream of a concentrator or crystallizer in the blowdown water stream. In either of these locations, the ET module provides useful heat to the produced water as well as removing organics.

DETAILED DESCRIPTION

Figure 1:
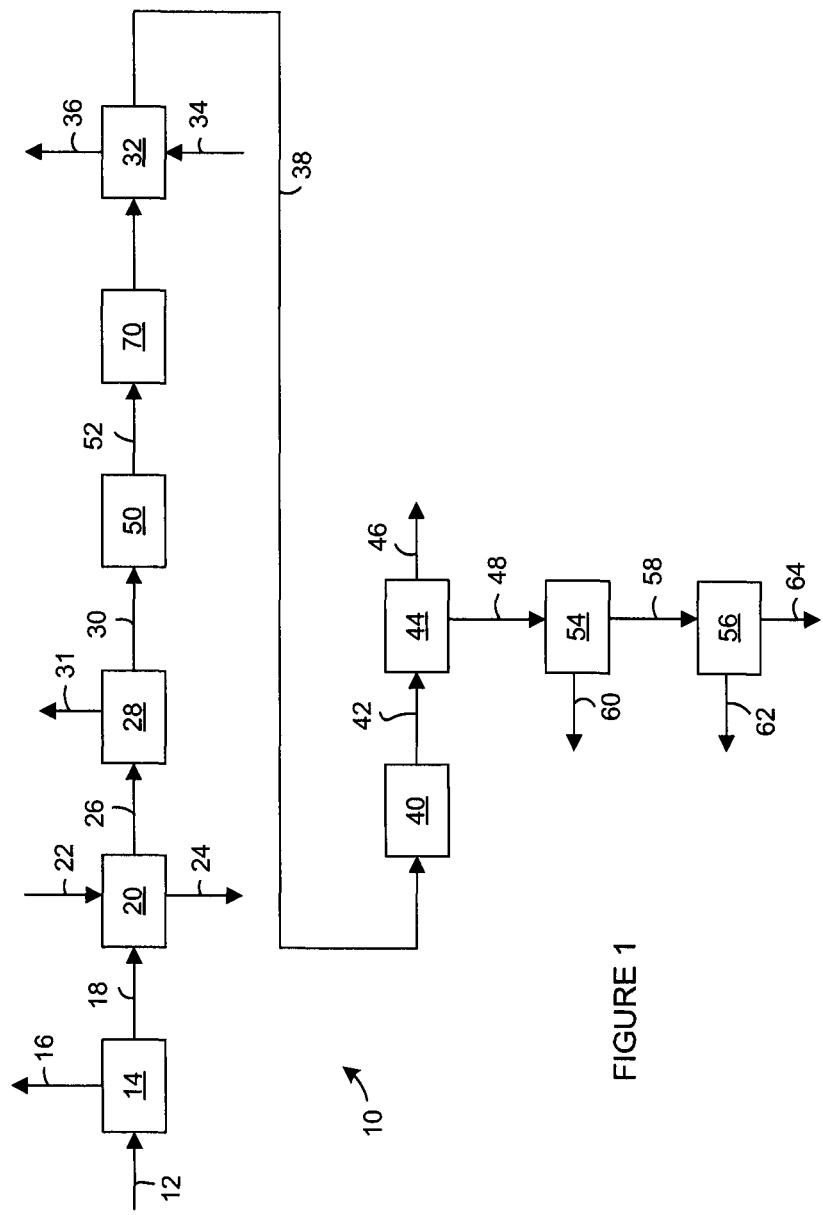
FIG. 1 is a schematic process flow diagram of a SAGD produced water treatment system having a CO or ET treatment module.

FIG. 1 shows a first SAGD produced water treatment system 10. Produced water 12 has already passed through a primary separator that has removed most of the oil from it. The produced water 12 flows to an optional second oil separator 14 to remove remaining oil. The second oil separator may be, for example, a bubble flotation device or a ceramic or walnut filter. Recovered oil 16 is removed, for example in a flotation forth or walnut filter scrub, for further refining to recover the oil. De-oiled process water 18, still containing a residual amount of emulsified oil, continues to be processed.

The de-oiled water 18 is sent to a lime softener 20. Lime, soda ash and/or magnesium oxide 22 are added to the water, allowing silica and hardness to be removed in softener sludge 24. Partially softened water 26 is then sent to a filter 28 wherein suspended solids are removed in backwash water 31. The filter 28 may be a media filter filled with anthracite, for example. Filtered water 30 flows to a secondary softener 32, for example a weak acid cation (WAC) softener. The secondary softener 32 consumes regeneration chemicals 34 and creates a regeneration waste 36. Softened water 38 flows to a steam boiler or generator 40, such as an OTSG. The steam generator 40 produces a partially pure steam 42, which is sent to a vapor liquid separator 44. This separator 44 removes liquid from the partially pure steam to create blowdown water 48. Remaining essentially pure steam 46 is ready for injection back into the oilfield.

The description of the treatment system 10 above is an example of how SAGD produced water may be treated. There are many possible variations. However, many SAGD produced water treatment systems similarly employ a sequence involving de-oiling, hot or warm lime softening, media or other particle filtration, brine or cation softening, steam generation, and liquid separation from the steam.

In the treatment system 10, an additional organics module 50 is added to destroy or degrade organic contaminants or emulsified oils or both in the produced water. The organics module 50 is placed upstream of the steam generator 40 in the system 10 to reduce fouling of the steam generator 40. In the system 10, the organics module 50 is also downstream of the lime softener 20 but upstream of the secondary softener 32. In this location, the organics module also reduces fouling of the ion exchange resins in the secondary softener 32, which is caused in part by dissolved organics. However, the organics module 50 may be placed in other locations in the system 10.

The organics module 50 uses chemical oxidation (CO) or electromagnetic treatment (ET) to treat the produced water. The CO or ET processes degrade or destroy organics in the produced water such as soluble organics or emulsified oil. Organics that are degraded tend to be characterized by a more negative charge and reduced aromatic and double bond content. The degraded organics have a reduced tendency to foul many surfaces.

Chemical oxidation may be provided by, for example, one or more of ozone, Fenton's process, wet air oxidation, thermally catalyzed methods, redox initiated methods, electrochemical oxidation methods or UV catalyzed oxidation methods. Electromagnetic treatment may be provided by, for example, microwave treatment. During the CO or ET process, one or more of the following changes may occur in the mixture of organic compounds in the produced water: (1) some or all of the soluble organics may be completely destroyed, for example by being mineralized, (2) some or all of the soluble organics may be partially degraded, for example by an oxidizing reaction resulting in the cleavage of aromatic or cycloalkane rings, and (3) some or all of the emulsified oils may be degraded to simpler oils or other organics. Organic compounds in the produced water that are not destroyed tend to be richer in oxygen groups, such as carboxylic or phenolic groups, and simpler in structure. The degraded compounds also tend to be characterized by increased polarity and negative charge. Performing the oxidation process at a high temperature, as is typically present in produced water treatment, enhances reaction kinetics and thereby lowers the required residence time of the produced water within an oxidation reactor.

The organics module 50 produces degraded process water 52. The degraded process water 52 passes through the secondary softener 32 and steam generator 40 as described previously. Because some of the organics have been degraded or destroyed, fouling of ion exchange resins in the secondary softener 32 is reduced. Fouling in the steam generator 40 is also reduced.

Most organics still remaining in the degraded process water 52 passing through the steam generator 40 remain in the liquid fraction of the partially pure steam 42. The remaining organics are therefore concentrated in blowdown 48, for example to about five times the concentration in the softened produced water 38 flowing to the steam generator. Conversely, the reduction in complex organics through the organics module 50 is enhanced by a factor of five in the blowdown water 48. The reduction in complex organics reduces the fouling tendency of the blowdown water 48 but also makes the blowdown water 48 easier to dry in a crystallizer 56. The crystallizer vaporizes water by thermal energy or by using a mechanical vapor compressor. In addition, the crystallizer 56 can also use calcium sulfate seeds to provide sites for salts in the produced water to precipitate as water vapor is removed. The presence of complex organics tends to interfere with complete drying, thus interfering with creating a near or zero liquid discharge process.

The system 10 combines the organics module 50 with a crystallizer 54 and, optionally, a brine concentrator 54. Brine concentrators 54 and crystallizers 56 are available from, for example, the Resource Conservation Company, part of the General Electric Company. Blowdown water 48 is re-circulated through the brine concentrator 54 as water is vaporized and removed from it. The water may be vaporized by, for example, waste steam or a mechanical vapor compressor. The vaporized water is condensed to a brine concentrator distillate 60 which may be reused in the steam generator 40. A concentrator bleed 58 from the recycle loop flows to the crystallizer 56. In the crystallizer 56, more water is removed by vaporization using, for example, waste steam or mechanical vapor compression. The vapor is condensed and removed as crystallizer distillate 62 which may be reused in the steam generator 40. A solid waste 64 is also removed from the crystallizer 56, resulting in a near or zero liquid discharge from the blowdown water 48.

Optionally, a secondary organics module 70 may be added after the organics module 50. The secondary organics module 70 uses a further treatment step, such as biological treatment or sorption, to further reduce the concentration of soluble organics or oil in the produced water. This further reduces the fouling tendencies of the produced water.

The secondary organics module 70 may treat the produced water by way of biological treatment. The dissolved organics in the raw produced water 12 are typically recalcitrant and traditional biological treatments are not very effective at degrading these compounds. For example, the dissolved organics may have aromatic moieties, or be rich in double bonds, making them difficult for microbes to degrade. The organics present in the raw produced water 12 may have, in particular, (poly)aromatic and naphthenic (cycloalkalne) structures. However, following treatment in the organics module 50, at least some of these rings are cleaved and the resultant molecules can be more easily biodegraded. Even if organic compounds are not destroyed, they are generally richer in oxygen or hydrogen, or both, and often simpler in structure, making biodegradation easier.

The biological treatment uses thermophillic (up to about 80 C) or extreme thermophillic (over 80 C) microorganisms to allow operation at the ambient temperature of the system 10. A bioreactor may be seeded with bacteria or other microorganism cultured from producing SAGD oil fields. Bacteria acclimated to high temperatures populate SAGD oil fields and use bitumen and the same organics to be removed from the produced water as food. Other sources of seed organisms may include other natural thermophillic environments, or commercially available specialized bacteria. Biological treatment may be conducted in a membrane bioreactor (MBR) using high temperature membrane materials such as ceramic membranes, activated sludge, trickling filters, rotating biological contactors (RBCs), moving bed biological reactors (MBBRs), biologically activated carbon, fixed bed bioreactors, or fluidized bed bioreactors.

Alternatively, the secondary organics module 70 may treat the produced water by way of a sorption process. During CO or ET in the organics module 50, compounds that are degraded (but not mineralized) tend to be richer in oxygen groups, such as carboxylic or phenolic groups, and tend to be simpler in structure. Molecules that are not degraded tend to be less polar. Organics that remain following the oxidation or electromagnetic treatment may pass through a sorption process in the secondary organics module 70. The sorption process may use, for example, activated carbon, organoclay, zeolites, or commercial oil removal substances such as those available from MyCelx Technologies Corporation. Organics are removed by passing the stream of produced water through a bed of the sorption material. The sorption material may be selected to preferentially target any non-polar compounds that were not degraded by the oxidation or electromagnetic treatment process. Water leaving the sorption process has a decreased concentration of organic contaminants, and so has a decreased tendency to foul downstream process. Further, organics that are left in solution following sorption tend to be polar and negatively charged. The remaining organics thus have a low affinity for sticking to many types of surfaces, further reducing the fouling potential of the produced water.

Although the organics module 50 and secondary organics module 70 are shown upstream of the steam generator 40, one or both of them may also be located in line with the blowdown water 48. The secondary organics module 70, with biological treatment in particular, is more efficient at higher concentrations of organics. Further, the crystallizer 56 may be the most sensitive component to organic contaminants, including partially degraded contaminants 52 leaving the organics module 50. Locating only the secondary organics module 70 in line with the blowdown 48, for example directly upstream of the crystallizer 56, may reduce the required size of the secondary organics module 70 while further upstream components such as the steam generator 40 are adequately protected by the organics module 50.

Figure 2:
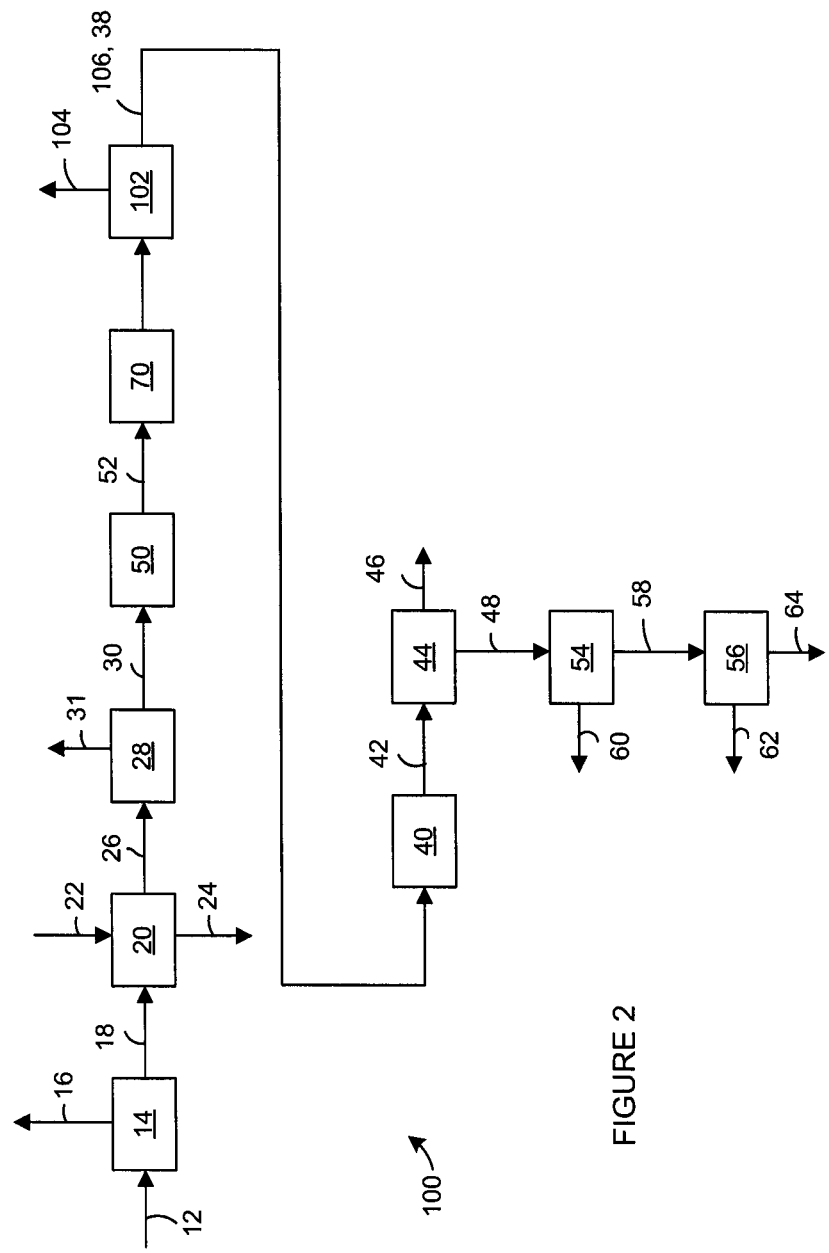
FIG. 2 is a schematic process flow diagram of another SAGD produced water treatment system having a CO or ET treatment module combined with a membrane filter.

FIG. 2 shows a second produced water treatment system 100. The second produced water treatment system 100 uses many of the same components as the treatment system 10, as indicated by the use of the same reference numerals. However, in the second treatment system 100 a membrane system 102 has been added in place of the secondary softener 32. The membrane system 102 uses one or more nanofiltration (NF) or reverse osmosis (RO) membrane elements, for example spiral would membrane cartridges. Optionally, an electro-coagulation module may be placed upstream of the membrane element. The membrane system 102 removes suspended solids as well as hardness and large organic molecules. The membrane system 102 thereby allows for the removal of the media filter 28 or the secondary softener 32 or both. However, the media filter 28 may be retained as a pre-filter for the membrane system 102. Further optionally, the membrane system 102 may be added after the secondary softener 32 and function as a polishing softener.

After being treated in the organics module 50, and optionally in the secondary organics module 70, the produced water 52 has fewer membrane foulants. In particular, at least a portion of the dissolved organics may have been destroyed, for example mineralized, or removed by biological degredation or sorption. Emulsified oils may have been modified to lighter molecules. Further, the remaining degraded organics have a reduced affinity for sticking to membrane surfaces. In particular, since membranes tend to be negatively charged, or can be selected with a negative surface charge, treated dissolved organics with a negative charge are repelled from the membrane surface and are more likely to exit with membrane reject 104. The permeate 106 passing through the membranes has essentially no hardness or large organic molecules, and so has very little tendency to foul the steam generator 40. The permeate 106 is also easily dried in the concentrator 54 and crystallizer 56.

Figure 3:
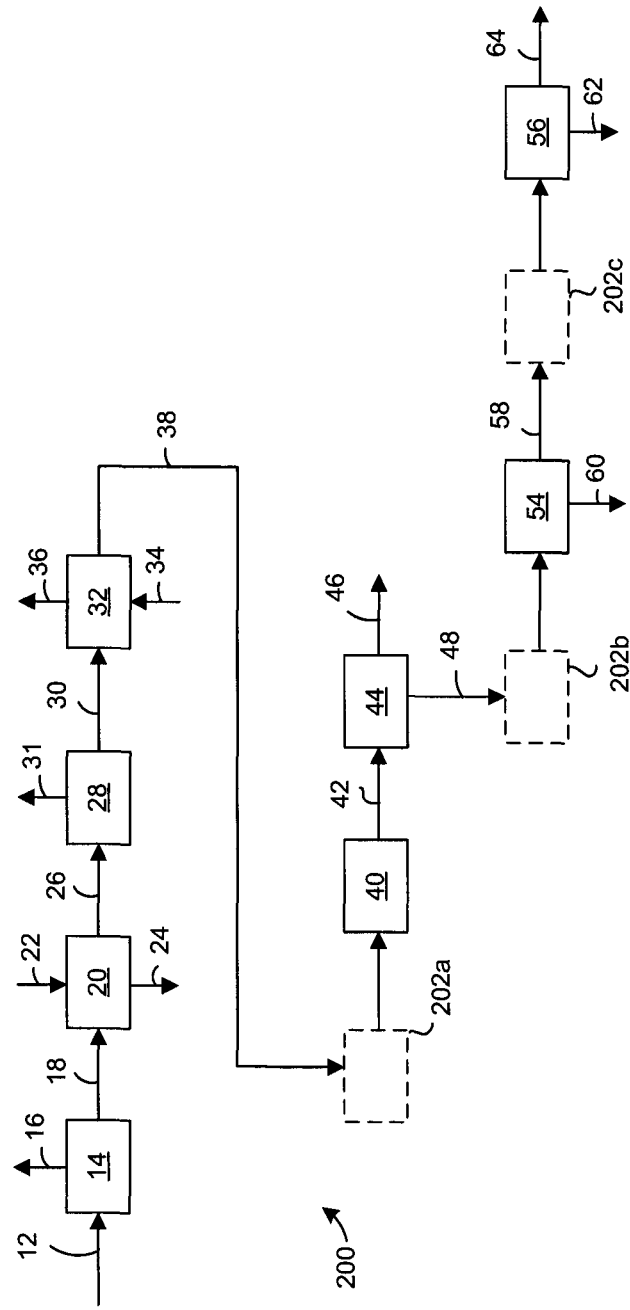
FIG. 3 is a schematic process flow diagram of another SAGD produced water treatment system having an ET treatment module directly upstream of an OTSG or in a blowdown stream.

FIG. 3 shows a third produced water treatment system 200. The third produced water treatment system 200 uses many of the same components as the treatment system 10, as indicated by the use of the same reference numerals. However, in the third treatment system 200, an ET process 202 is used in particular for the organics module 50 and located directly upstream of the steam generator 40 or in line with the blowdown water 48. In particular, the ET process 202 is used in one or more of the three areas 202*a*, 202*b* and 202*c* shown.

The ET process may use, for example, microwaves to treat the produced water. Microwave irradiation attacks organic compounds, reducing the chemical oxygen demand (COD) concentration of aqueous solutions. At the same time, microwave irradiation also heats the water. This heating is beneficial when the ET process is used near and upstream of the steam generator 40, the brine concentrator 54 or the crystallizer 56. Sensible heat reduces the amount of energy required in those devices to produce steam. Further, a portion of the water may be converted to steam in the ET process itself, thus reducing the load on the steam generator 40, the brine concentrator 54 or the crystallizer 56. Optionally, an ET process located as described in the third system 200 may be used in addition to another organics module 50, and further optionally a second organics module 70 or a membrane system 102, located further upstream in the third system 200. Alone or in such a combination, the level of dissolved organics is reduced to a level that will not impede complete drying by the crystallizer 56.

Although the ET treatment may be applied before the steam generator 40 or before the concentrator 54 to protect multiple downstream units from fouling, the benefit of heating the water is greatest where the water flow rate being treated is small and the organic content is high. In particular, the ET treatment may be applied at location 202*c* directly upstream of the crystallizer 56. The ET treatment may be applied in this location only to the extent required to degrade organic contaminants to the point where the crystallizer 56 can produce a sufficiently dried waste 64. Alternatively, the ET process can be applied beyond the level needed to treat organic contaminants to further assist in drying the blowdown water. Optionally, the ET treatment may be used to dry the blowdown water completely, allowing the crystallizer 56 to be removed.

Reducing the rate of fouling buildup on the walls of the steam generator 40 improves the heat transfer efficiency in the steam generation process and in heat exchangers, reducing the amount of energy required to re-use produced water. A reduced rate of fouling buildup also allows for simpler or less frequent cleaning of the steam generator 40. Fouling in resin exchange softeners can also be reduced. Reducing organic content in the blowdown water allows a crystallizer to be used even with heavily contaminated raw produced water 12. Optionally, the organics treatment can also provide useful heat for steam generation or other thermal processes.

We claim:

1. A process for treating produced water comprising steps of, degrading organics in the produced water by way of chemical oxidation; passing the produced water with degraded organics through a steam generator; separating a liquid blowdown from an output from the steam generator; and treating the liquid blowdown in a crystallizer, wherein the chemical oxidation is applied to the liquid blowdown upstream of the crystallizer.

2. The process of claim 1, further comprising a step of passing the produced water with degraded organics through a sorption media.

3. The process of claim 1, wherein the step of degrading organics in the produced water comprises adding an oxidant to the produced water.

4. The process of claim 1, produced further comprising a step of passing the water through a reverse osmosis membrane after the step of degrading organics in the produced water.

5. The process of claim 4, further comprising a step of treating the produced water by sorption between the steps of degrading organics in the produced water and passing the produced water through a reverse osmosis membrane.

6. The process of claim 1, further comprising a step of passing the produced water through a resin exchange softener after the step of degrading organics in the produced water.

7. The process of claim 1, further comprising a step of: passing the produced water with degraded organics through a sorption media before passing the produced water through the steam generator.

8. The process of claim 1, comprising a step of lime softening the produced water prior to the step of degrading organics in the produced water by way of chemical oxidation.

9. The process of claim 1, wherein the produced water is drawn from a steam assisted gravity drainage production well, the produced water with degraded organics passes through a once-through steam generator, and generated steam is injected into ground above the production well.

10. A system for treating produced water from a steam assisted gravity drainage production well to produce steam for injection into ground above the production well comprising:
  a) a steam generator;
  b) a crystallizer connected to receive blowdown water from the steam generator; and,
  c) a chemical oxidation module located so as to intercept the blowdown water upstream of the crystallizer.

11. The system of claim 10, further comprising a sorption column downstream of the chemical oxidation module and located so as to intercept the blowdown water upstream of the crystallizer.

12. A system for treating produced water from a steam assisted gravity drainage production well to produce steam for injection into ground above the production well comprising:
  a) a steam generator;
  b) a chemical oxidation module located so as to intercept blowdown water flowing from the steam generator to a crystallizer; and,
  c) a reverse osmosis membrane filter downstream of the chemical oxidation module.

13. The system of claim 12, further comprising a sorption column downstream of the chemical oxidation module and upstream of the membrane filter.

* * * * *

UNITED STATES PATENT AND TRADEMARK OFFICE
CERTIFICATE OF CORRECTION

PATENT NO.        : 9,731,989 B2
APPLICATION NO.   : 12/971556
DATED             : August 15, 2017
INVENTOR(S)       : David M. Polizzotti et al.

Page 1 of 1

It is certified that error appears in the above-identified patent and that said Letters Patent is hereby corrected as shown below:

In Column 8, Line 11, Claim 4, please amend:
-- ...produced further comprising a step of passing the water through... --
And correct error to read:
-- ...further comprising a step of passing the produced water through... --

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*